United States Patent [19]

Hergenrother et al.

[11] 4,182,836
[45] Jan. 8, 1980

[54] POLYPHOSPHAZENE COPOLYMERS CONTAINING SUBSTITUENTS FROM ALKYLPHOSPHITE

[75] Inventors: William L. Hergenrother, Akron; Adel F. Halasa, Bath, both of Ohio

[73] Assignee: The Firestone Tire & Rubber Company, Akron, Ohio

[21] Appl. No.: 941,111

[22] Filed: Sep. 8, 1978

[51] Int. Cl.² .................... C08G 79/02; C08G 85/00
[52] U.S. Cl. .............................. 528/168; 528/374; 528/399
[58] Field of Search ......................... 528/399, 168

[56] References Cited

U.S. PATENT DOCUMENTS 3,591,530  7/1971  Sollberger et al. ............... 528/391

FOREIGN PATENT DOCUMENTS 812126  4/1959  United Kingdom ............... 528/168

*Primary Examiner*—Wilbert J. Briggs, Sr.

[57] ABSTRACT

Polyphosphazene copolymers are prepared which contain randomly distributed units represented by the formulas:

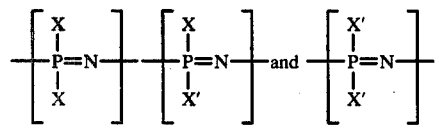

wherein X is —OP(OR)₂ in which R is a branched, straight chain or cyclic alkyl group containing from 1 to 12 carbon atoms or mixtures thereof, and wherein X' is selected from the group consisting of substituted and unsubstituted alkoxy, aryloxy, amino and mercapto groups. The alkyl groups may vary in carbon chain length or structure within the phosphite or all be the same.

In the copolymer units represented by the above formulas, all X substituent groups may be the same or they may be mixed and all X' substituent groups may be the same or mixed. In the mixtures, the X substituent groups may be mixtures of different alkylphosphite groups and the X' substituent groups may be mixtures of different alkoxy, aryloxy, amino and mercaptan groups.

The specific proportion of X to X' substituent groups incorporated in the copolymers of the invention may vary considerably depending upon the particular end use for which the copolymer is intended, chemical and physical properties desired, and the degree of crosslinking desired. In general, the copolymers may contain from about 0.1 to about 55 mole percent of the X substituent and from about 45 to about 99.1 mole percent of the X' substituent. The preferred range is from about 0.5 to about 20 mole percent of the X substituent and from about 80 to about 99.5 mole percent of this X substituent. For applications such as moldings, coatings, foams and the like, the copolymer should contain at least ten (10) percent by weight of the X substituent.

The copolymers of the invention can be utilized to form protective films and may also be utilized in applications such as for moldings, coatings, and the like. The copolymers of this invention also crosslink at room temperature in the presence of water.

10 Claims, No Drawings

POLYPHOSPHAZENE COPOLYMERS CONTAINING SUBSTITUENTS FROM ALKYLPHOSPHITE

BACKGROUND OF THE INVENTION

This invention relates to polyphosphazene copolymers containing repeating

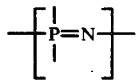

units in the polymer chain in which alkylphosphite substituents and other compatible substituents are attached to the phosphorus atom. More particularly, the invention relates to polyphosphazene copolymers containing alkylphosphite substituents and substituted or unsubstituted alkoxy, aryloxy, amino and mercapto groups.

Polyphosphazene polymers containing repeating

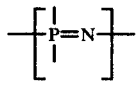

units in which various alkoxy, substituted alkoxy, aryloxy and substituted aryloxy groups are attached to the phosphorus atom and their method of preparation are described in the prior art as illustrated in the publication "Nitrogen-Phosphorus Compounds," Academic Press, New York, New York 1972 by H. R. Allcock and "Poly(Organophosphazenes)," Chemtech, Sept. 19, 1975 by H. R. Allcock and in such U.S. Pat. Nos. as 3,515,688; 3,702,833; and 3,856,712.

However, none of the prior art of which applicants are aware, discloses or suggests polyphosphazene copolymers containing alkylphosphite substituents attached to the phosphorus atom or methods of preparing such copolymers.

SUMMARY OF THE INVENTION

In accordance with this invention, novel polyphosphazene copolymers containing alkylphosphite and substituted or unsubstituted alkoxy, aryloxy, amino or mercapto substituents are prepared.

The copolymers of the invention contain repeating units represented by the formulas:

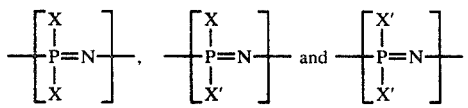

wherein X is —OP(OR)$_2$, in which R is a branched, straight chain or cyclic alkyl radical containing 1 to 12 atoms, X' is selected from the group consisting of substituted or unsubstituted alkoxy, aryloxy, amino and mercapto radicals, and the polymer can contain from 20 to 50,000 of such units. The R groups may vary in chain length within the phosphite.

In the copolymer units represented by the above formulas, all X substituent groups may be the same or they may be mixed and all X' substituent groups may be the same or mixed. In the mixtures, the X substituent groups may be mixtures of different alkylphosphite groups and the X' substituent groups may be mixtures of different alkoxy, aryloxy, amino or mercapto groups.

The specific proportion of X to X' substituent groups incorporated in the copolymers of the invention may vary considerably depending upon the particular end use for which the copolymer is intended, chemical and physical properties desired, and the degree of crosslinking desired. In general, the copolymers may contain from about 0.1 to about 55 mole percent of the X substituent and from about 45 to about 99.1 mole percent of the X' substituent. The preferred range is from about 0.5 to about 20 mole percent of the X substituent and from about 80 to about 99.5 mole percent of the X' substituent. For applications such as moldings, coatings, foams and the like, the copolymer should contain at least ten (10) percent by weight of the X substituent.

The copolymers are prepared by reacting a poly(dichlorophosphazene) having the formula —(NPCl$_2$)$_n$—, in which n is from 20 to 50,000, with a mixture of an alkylphosphite and a substituted or unsubstituted aliphatic alcohol, aromatic alcohol, amino compound or mercaptan compound in the presence of a tertiary amine.

The phosphite reaction with the poly(dichlorophosphazene) in the presence of the tertiary amine is set out below; the remainder of the reaction with a substituted or unsubstituted aliphatic or aromatic alcohol, an amino compound or a mercaptan compound is defined in the prior art.

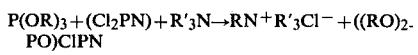

The above reaction is illustrative and shows only one chlorine substitution; it is understood the other chlorine may be replaced by a phosphite or one of the other substituent groups as defined above and hereinafter.

The polymers can be used to prepare films and may be utilized in applications such as molding and coatings. They also exhibit a crosslinking reaction at room temperature in the presence of water.

DETAILED DESCRIPTION OF THE INVENTION

As indicated above, the polyphosphazene polymers of this invention are prepared by reacting a poly(dichlorophosphazene) polymer having the structure —(NPCl$_2$)$_n$—, in which n is from 20 to 50,000 with a mixture of an alkylphosphite and a substituted or unsubstituted aliphatic alcohol, aromatic alcohol, amino compound or mercaptan compound in the presence of a tertiary amine.

I. THE POLY(DICHLOROPHOSPHAZENE) POLYMER

Poly(dichlorophosphazene) polymers which are employed as starting materials in the process of this invention are well known in the art as illustrated in U.S. Pat. Nos. 3,370,020; 4,005,171; and 4,055,520 and the aforementioned publications of H. R. Allcock, the disclosures of which are incorporated herein by reference.

These polymers have the general formula —(NCl$_2$)$_n$—, in which n may range from 20 to 50,000 or more. As described in the aforementioned references, the polymers are in general prepared by the thermal polymerization of cyclic oligomers having the formula —(NPCl$_2$)$_n$—, in which n is an integer of from 3 to 7, with the cyclic trimer and tetramer often comprising up to 90% of the oligomers.

The specific conditions of temperature, pressure and time employed in the thermal polymerization of the cyclic oligomers can vary considerably depending on whether or not the polymerization is catalyzed. Thus, temperatures may range from about 130° C. to about 300° C., pressures may range from a vacuum of less than about $10^{-1}$ Torr to superatmospheric and times may range from 30 minutes to about 48 hours.

A preferred process for preparing the poly(dichlorophosphazene) polymers used in the process of this invention is described in the aforementioned incorporated U.S. Pat. No. 4,005,171.

II. SUBSTITUENTS

Alkylphosphites which may be employed in forming the copolymers of the invention are alkylphosphites having the general formula $P(OR)_3$ where R may be a branched, straight chain or cyclic alkyl radical containing from 1 to 12 carbon atoms. The alkyl radicals may vary from one site to another in the phosphite or may be identical at each site. Illustrative examples of alkylphosphites which may be suitably employed are trimethyl phosphite, triethyl phosphite, tripropyl phosphite and the like.

As indicated heretofore, the polyphosphazene copolymers of the invention in addition to the alkylphosphite substituent group may contain substituted or unsubstituted alkoxy, aryloxy, amino or mercapto groups.

Preferred substituent groups represented by X' for use in these copolymers are alkoxy groups, especially fluoroalkoxy groups and aryloxy groups, especially halogen-substituted phenoxy groups.

The alkoxy groups (substituted or unsubstituted) may be derived from aliphatic alcohols having from 1 to 20 carbon atoms such as methanol, ethanol, propanol, isopropanol, n-butanol, sec-butanol, hexane, dodecanol and the like; fluoroalcohols, especially those represented by the formula $Z(CF_2)_nCH_2OH$ in which Z is hydrogen or fluorine and n is an integer from 1 to 10 as illustrated by trifluoroethanol, 2,2,3,3,3-pentafluoropropanol, 2,2,3,3,4,4,4-heptafluorobutanol; 2,2,3,3-tetrafluoropropanol, 2,2,3,3,4,4,5,5-octafluoropentanol, 2,2,3,3,4,4, 5,5,6,6,7,7-dodecafluoroheptanol and the like. In instances where it is desired to incorporate mixed X' substituent groups in the copolymers, mixtures of the foregoing alcohols may be employed.

The aryloxy groups (substituted or unsubstituted) may be derived from aromatic alcohols including among others phenol; alkylphenols such as cresols, xylenols, p-, o-, and m- ethyl and propyl phenols and the like; halogen-substituted phenols such as p-, o-, and m-chloro and bromo phenols and di- or tri-halogen substituted phenols and the like; and alkoxy-substituted phenols such as 4-methoxyphenol, 4-(n-butoxy) phenol and the like. Mixtures of the foregoing aromatic alcohols may also be employed.

The amino groups may be derived from any of the amino compounds heretofore employed in the polyphosphazene polymer art. Thus, the amino groups may be derived from aliphatic primary and secondary amines such as methylamine, ethylamine, dimethylamine, ethylmethylamine and the like and aromatic amines such as those described in U.S. Pat. No. 4,042,561, incorporated herein by reference, as illustrated by aniline, halogen-substituted anilines, alkyl-substituted anilines, alkoxy-substituted anilines and the like.

The mercapto groups may be derived from any of the mercaptan compounds heretofore employed in the polyphosphazene polymer art. Thus, for example, the mercaptan compounds described in U.S. Pat. No. 3,974,242 to Lanier et al, incorporated herein by reference, may be utilized. Representative of suitable mercaptan compounds as described in the aforementioned patent are methyl mercaptan and its homologs ethyl, propyl, butyl, aryl and hexyl mercaptans, thiophenol, thionaphthols, benzyl mercaptan, cyclohexyl mercaptan and the like.

III. THE TERTIARY AMINE

The use of the tertiary amine minimizes undesirable side reactions and at the same time acts as an effective acid scavenger.

Tertiary amines which may be employed in preparing the polymers of the invention are those represented by the general structure:

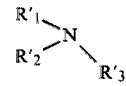

wherein $R'_1$, $R'_2$, and $R'_3$ may each be alkyl containing from 1 to 8 carbon atoms. Thus, for example, the tertiary amine may be a trialkyl amine such as trimethylamine, triethylamine, tri-isopropylamine, tri-n-propylamine, tri-isobutylamine, tri-n-butylamine, and the like. In addition, tertiary amines such as pyridine, N,N,N',N'-tetramethylethylene diamine (TMEDA), dipipyridyl ethane, 1,4 diaza bicyclo (2.2.2) octane (DABCO), N-methyl pyrolle and N-methyl morpholine can also be utilized.

The preferred tertiary amines for use in preparing the polymers of the invention are triethylamine, N,N,N',N'-tetramethylethylene diamine and pyridine.

As indicated above, the copolymers of the present invention are prepared by reacting the poly(dichlorophosphazene) polymer and a substituent mixture of an alkylphosphite and a substituted or unsubstituted aliphatic alcohol, aromatic alcohol, amino compound or mercaptan compound in the presence of a tertiary amine.

The specific reaction conditions and proportion of ingredients employed in preparing these copolymers can vary somewhat depending on factors such as the reactivity of the specific substituent mixture utilized, the particular tertiary amine employed, and the degree of substitution desired in the finished polymer. In general, reaction temperatures may range from about 25° C. to about 200° C. and times may range from 3 hours up to 7 days; lower temperatures necessitating longer reaction times and higher temperatures allowing shorter reaction times. These conditions are, of course, utilized in order to obtain the most complete reaction possible, i.e. in order to insure substantially complete conversion of the chlorine atoms in the polymer to the corresponding ester of the substituent mixture.

The above reaction is ordinarily carried out in the presence of a solvent. The solvent employed in the reaction should be a solvent for the poly(dichlorophosphazene) polymer, the alkylphosphite reactant, other reactants and the tertiary amine.

In addition, the materials in the reaction zone should be reasonably free of water, most preferably containing 0.01 percent by weight of water or less. The prevention of water in the reaction system is necessary in order to inhibit the reaction of the available chlorine atoms in the chloropolymer therewith. Examples of suitable solvents which may be employed include diglyme, triglyme, tetraglyme, toluene, xylene, cyclohexane, chloroform, dioxane, dioxalene, methylene chloride, tetrachloroethane, and tetrahydrofuran. The amount of solvent employed is not critical and any amount sufficient to solubilize the reaction mixture materials can be employed.

In general, the amount of the alkylphosphite reactant and other reactants employed in the process should be at least molecularly equivalent to the number of available chlorine atoms in the polymer mixture. However, if desired an excess of such reactants may be employed in order to insure substantially complete reaction of all the available chlorine atoms.

Also the presence of water yields crosslinks with the copolymer of this invention at room temperature, therefore, the absence of water is vital until this reaction is desired. Specifically, the alkyl groups in the phosphite linkages in the copolymer of this invention will react with water (hydrolyze) to yield POH groups on the copolymer. The POH site will react with other POR or POH to give P-O-P crosslinks. This reaction occurs at room temperature. Its rate is controlled by the amount of phosphite or water present. The resulting crosslinked product is readily realized and; due to its high inorganic character, yields improved flame retardant, heat stability and solvent resistance properties.

The following examples are submitted for the purpose of further illustrating the nature of the present invention and are not intended as a limitation on the scope thereof. Parts and percentages referred to in the example are by weight unless otherwise indicated.

EXAMPLE I

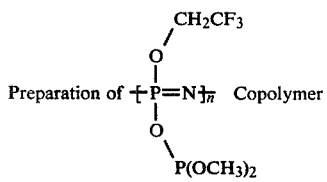

To a 10 ounce beverage bottle was charged 5.2 cc (44 millimoles) of trimethyl phosphite, P(OCH$_3$)$_3$, 100 cc of dry tetrahydrofuran (hereinafter THF, 12.3 cc (88 millimoles) of triethylamine, 3.2 cc (44 millimoles) of trifluoroethanol, and 35.9 gms. of a 12.85% THF solution of poly(dichlorophosphazene) (39.9 millimoles) having a degree of polymerization of about 2600. After 68 hours at 80° C. in a rotary bath and cooling, no PCL bonds could be detected by Infrared spectroscopy.

The THF insoluble chloride salts settled out as needle crystals. The remaining solution was evaporated to yield a hard, brittle film that was insoluble in THF.

An analysis of the polymeric product showed the following results:

Actual (%)     C 18.60, H 2.12, N 8.13, P 19.01, Cl 2.54

From this the composition of the film was assumed to be 19.6% hydrolyzed chloropolymer, 9.0% triethylamine methylchloride, 59.0% trifluoroethoxy derivative and 10.4% dimethyl phosphite derivative.

This composition has a calculated analysis of:

Calculated (%)     C 18.56, H 3.04, N 8.26, P 18.89, Cl 2.11

EXAMPLE II

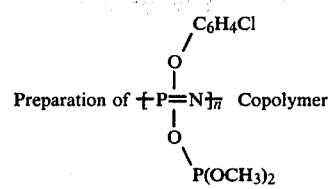

To a 10 ounce beverage bottle was charged 2.60 cc (22 millimoles) of trimethyl phosphite, P(OCH$_3$)$_3$, 100 cc of dry THF, 8.49 grams (66 millimoles) of p-chlorophenol, 12.3 cc (88 millimoles) of triethylamine and 42.7 grams (40.3 millimoles) of a 10.93% cyclohexane solution of poly(dichlorophosphazene) having a degree of polymerization of about 2600. Heating in an oven for 20 hours at 120° C. gave a colorless solution with insoluble amine salts. Infrared spectroscopy showed no PCl band at 600 cm$^{-1}$ and new bands at 543, 512 and 492 cm$^{-1}$.

Casting a film gave a white rubbery film that was insoluble in THF after standing in air after 2 days.

We claim:

1. A polyphosphazene copolymer containing randomly distributed units represented by the formulas:

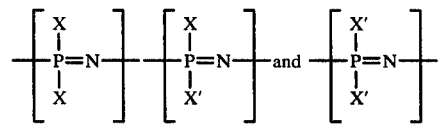

wherein X is —OP(OR)$_2$ in which R is selected from the group consisting of branched, straight chain and cyclic alkyl groups containing from 1 to 12 carbon atoms and where X' is selected from the group consisting of substituted and unsubstituted alkoxy, aryloxy, amino and mercapto groups.

2. The copolymer of claim 1 wherein all R groups are identical.

3. The copolymer of claim 1 wherein the R groups are dissimilar.

4. The copolymer of claim 1 wherein X is —OP(OCH$_3$)$_2$ and X' is —OCH$_2$CF$_3$.

5. The copolymer of claim 1 wherein X is —OP(OCH$_3$)$_2$ and X' is —OC$_6$H$_4$Cl.

6. A method of preparing polyphosphazene copolymers containing randomly distributed units represented by the formulas:

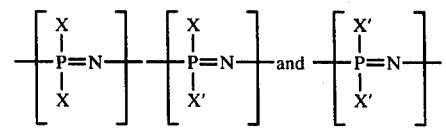

wherein X is —OP(OR)$_2$ in which R is selected from the group consisting of branched, straight chain and cyclic alkyl radicals containing from 1 to 12 carbon atoms and wherein X' is selected from the group consisting of substituted and unsubstituted alkoxy, aryloxy, amino, and mercapto groups; said method comprising reacting a poly(dichlorophosphazene) polymer having the formula —(NPCl$_2$)$_n$—, wherein n is from 20 to 50,000, with a mixture consisting of an alkylphosphite and a substituted or unsubstituted aliphatic alcohol, aromatic alcohol, amino compound, or mercaptan compound in the presence of a tertiary amine.

7. The method of claim 6 wherein said alkylphosphite is trimethyl phosphite.

8. The method of claim 6 wherein said mixture consists of trimethyl phosphite and trifluoroethanol.

9. The method of claim 6 wherein said mixture consists of trimethyl phosphite and p-chlorophenol.

10. The method of claim 6 wherein said tertiary amine is triethylamine.

* * * * *